United States Patent
Ghanekar et al.

(10) Patent No.: US 7,805,204 B2
(45) Date of Patent: Sep. 28, 2010

(54) INTEGRATED ELECTRICAL POWER DISTRIBUTION SYSTEM USING COMMON BUILDING BLOCKS

(75) Inventors: Milind Ghanekar, Mississauga (CA);
Randy J. Fuller, Hillsburgh (CA);
Zhenning Z. Liu, Mississauga (CA);
Ted J. Gayowsky, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 287 days.

(21) Appl. No.: 12/018,670

(22) Filed: Jan. 23, 2008

(65) Prior Publication Data

US 2008/0234838 A1 Sep. 25, 2008

Related U.S. Application Data

(60) Provisional application No. 60/896,203, filed on Mar. 21, 2007.

(51) Int. Cl.
*G05B 11/01* (2006.01)
*G05D 17/00* (2006.01)

(52) U.S. Cl. ........................... 700/22; 700/286
(58) Field of Classification Search ............... 700/9, 700/10, 22, 79, 286, 292; 323/909; 702/33–35; 361/1, 62
See application file for complete search history.

(56) References Cited

U.S. PATENT DOCUMENTS

| | | | | |
|---|---|---|---|---|
| 4,740,883 A | * | 4/1988 | McCollum | ............... 700/22 |
| 5,225,994 A | * | 7/1993 | Arinobu et al. | ............. 700/286 |
| 5,309,708 A | | 5/1994 | Stewart et al. | |
| 5,752,047 A | * | 5/1998 | Darty et al. | ................ 713/300 |
| 5,793,587 A | | 8/1998 | Boteler | |
| 5,945,802 A | | 8/1999 | Konrad et al. | |
| 6,504,730 B1 | | 1/2003 | Cooney et al. | |
| 6,801,942 B1 | * | 10/2004 | Dietrich et al. | ............. 709/225 |
| 6,856,045 B1 | | 2/2005 | Beneditz et al. | |

(Continued)

FOREIGN PATENT DOCUMENTS

WO   WO 01/47082   6/2001

OTHER PUBLICATIONS

*Automated Power-Distribution System*, NTIS Tech Notes, US Department of Commerce, Springfield, VA, Feb. 1, 1991, pp. 128-129.

(Continued)

*Primary Examiner*—M. N. Von Buhr
(74) *Attorney, Agent, or Firm*—Oral Caglar, Esq.

(57) ABSTRACT

An electrical power distribution system includes a data bus, separate from the main aircraft data bus, internal to the aircraft electrical power distribution system and an electric power control unit (EPCU) in communication with the internal data bus. Primary and emergency power distribution subsystems include line replaceable modules (LRM) connected in the aircraft electrical power distribution system as electrical load control units (ELCU), each having a common supervisory control interface in communication with the internal data bus, while a secondary power distribution subsystem includes LRMs connected in the aircraft electrical power distribution system as solid state power control (SSPC) units, each having the common supervisory control interface in communication with the internal data bus. The common supervisory control interfaces all execute a common supervisory control logic for receiving commutation commands from the EPCU and providing status back to the EPCU.

20 Claims, 4 Drawing Sheets

U.S. PATENT DOCUMENTS

| | | | |
|---|---|---|---|
| 6,999,291 B2 * | 2/2006 | Andarawis et al. | 361/64 |
| 7,007,179 B2 | 2/2006 | Mares et al. | |
| 7,103,456 B2 * | 9/2006 | Bloch et al. | 701/3 |
| 7,130,170 B2 | 10/2006 | Wakefield et al. | |
| 7,151,329 B2 * | 12/2006 | Andarawis et al. | 307/52 |
| 7,162,653 B2 | 1/2007 | Mares et al. | |
| 7,193,337 B2 | 3/2007 | Nguyen | |
| 7,205,681 B2 | 4/2007 | Nguyen | |
| 7,489,992 B2 * | 2/2009 | Valette et al. | 701/33 |
| 7,505,820 B2 * | 3/2009 | Plivcic et al. | 700/22 |
| 7,580,235 B2 * | 8/2009 | Hamasaki et al. | 361/115 |
| 7,634,329 B2 * | 12/2009 | Liu et al. | 700/292 |
| 2006/0071559 A1 * | 4/2006 | Hanson et al. | 307/43 |
| 2006/0087782 A1 * | 4/2006 | Michalko et al. | 361/62 |
| 2006/0101296 A1 * | 5/2006 | Mares et al. | 713/300 |
| 2007/0027655 A1 * | 2/2007 | Schmidt | 702/188 |
| 2007/0081284 A1 | 4/2007 | McAvoy et al. | |
| 2008/0100140 A1 * | 5/2008 | Sorenson et al. | 307/40 |

OTHER PUBLICATIONS

*Automated Power-Distribution System*, NTIS Tech Notes, US Department of Commerce, Springfield, VA, Jul. 1, 1992, pp. 483-484.
Paul M. Anderson et al., *Automated Power Distribution System Hardware*, National Aeronautics and Space Administration, Marshall Space Flight Center, Alabama, Aug. 6, 1989, pp. 579-584.
European Search Report dated Jan. 15, 2009.

* cited by examiner

INTEGRATED ELECTRICAL POWER DISTRIBUTION SYSTEM USING COMMON BUILDING BLOCKS

CROSS REFERENCE TO RELATED APPLICATIONS

This application claims the benefit of U.S. Provisional Application No. 60/896,203, filed Mar. 21, 2007.

BACKGROUND OF THE INVENTION

The present invention generally relates to more electric aircraft and, more particularly, to electric power distribution systems for aircraft.

There has been a growing trend in developing more electric aircraft (MEA). The MEA concept employs an overall system approach to optimizing the airframe and engine systems of aircraft on the premise that significant benefits can be achieved by replacing today's pneumatic, hydraulic and electric airframe power systems with predominantly electric power. The trend toward MEA creates increased demands for electric power and more sophisticated power distribution and load management systems. As a result, more and more intelligence has been incorporated into such aircraft electric power distribution and load management systems.

The conventional, prior art architecture for an aircraft electric power distribution system normally includes three completely independent subsystems: a primary power distribution system, a secondary power distribution system, and an emergency power distribution system. These three subsystems are usually coordinated with each other via an aircraft communication network.

For example, the primary power distribution system typically includes a number of primary distribution units; the secondary primary power distribution system typically includes a number of secondary distribution units; and each primary or secondary distribution unit is independent of the others and communicates directly to the aircraft, e.g., via a direct connection to the aircraft data bus. Although both primary and secondary subsystems perform a number of similar functions and share many common functions, these independent subsystems typically have different implementations, i.e., different hardware, different software, different physical and electrical interfaces, and different communication interfaces. Nevertheless, the different implementations of subsystems in such a conventional power distribution system architecture give rise to duplication of functionality throughout the power distribution system. Such duplication may be viewed as inefficient in terms of unnecessary cost or weight of the system (especially for aircraft) if it were possible to eliminate any of the duplication without loss of any functionality of the system. In addition, the use of such differently implemented subsystems adds complexity and risk to the overall system integration for the power distribution system, because the overall system integration is typically, and in many cases can only be, performed after the development is complete for each of the different individual subsystems.

Using the architecture of prior art power distribution systems, however, it is neither feasible nor cost effective to try to eliminate the duplication of hardware or duplication of functionality.

As can be seen, there is a need for an integrated electric power distribution system having an architecture that avoids the duplicate functionalities and duplication of hardware found in prior art electric power distribution systems.

SUMMARY OF THE INVENTION

In one aspect of the invention, an electrical power distribution system includes a first line replaceable module (LRM) connected to a first subsystem of the electrical power distribution system and providing electrical load control unit (ELCU) functioning for the first subsystem; a second LRM connected to a second subsystem of the electrical power distribution system and providing solid state power control (SSPC) unit functioning for the second subsystem; and the first LRM and the second LRM have identical common supervisory control interface units.

In another aspect of the invention, an aircraft electrical power distribution system includes a data bus that is internal to the aircraft electrical power distribution system; an electric power control unit (EPCU) in communication with the internal data bus; a primary power distribution subsystem comprising a first line replaceable module (LRM) connected in the aircraft electrical power distribution system as an electrical load control unit (ELCU) and having a first common supervisory control interface in communication with the internal data bus; a secondary power distribution subsystem comprising a second line replaceable module (LRM) connected in the aircraft electrical power distribution system as a solid state power control (SSPC) unit and having a second common supervisory control interface in communication with the internal data bus; and the first common supervisory control interface and the second common supervisory control interface execute a common supervisory control logic to receive commutation commands from the EPCU and to provide status back to the EPCU.

In still another aspect of the present invention, a method of distributing electrical power in a vehicle having a main data bus includes steps of: performing electrical load control unit (ELCU) functioning under supervisory control of an electric power control unit (EPCU) using a standard logic and a standard data format for communication between an ELCU-line replaceable module (ELCU-LRM) and the EPCU; and performing solid state power control (SSPC) functioning under supervisory control of the EPCU using the standard logic and data format for communication between an SSPC-LRM and the EPCU, in which the communication between the EPCU and the ELCU-LRM and the SSPC-LRM uses a power distribution system internal data bus distinct from the vehicle main data bus.

These and other features, aspects and advantages of the present invention will become better understood with reference to the following drawings, description and claims.

DETAILED DESCRIPTION OF THE INVENTION

Figure 1:
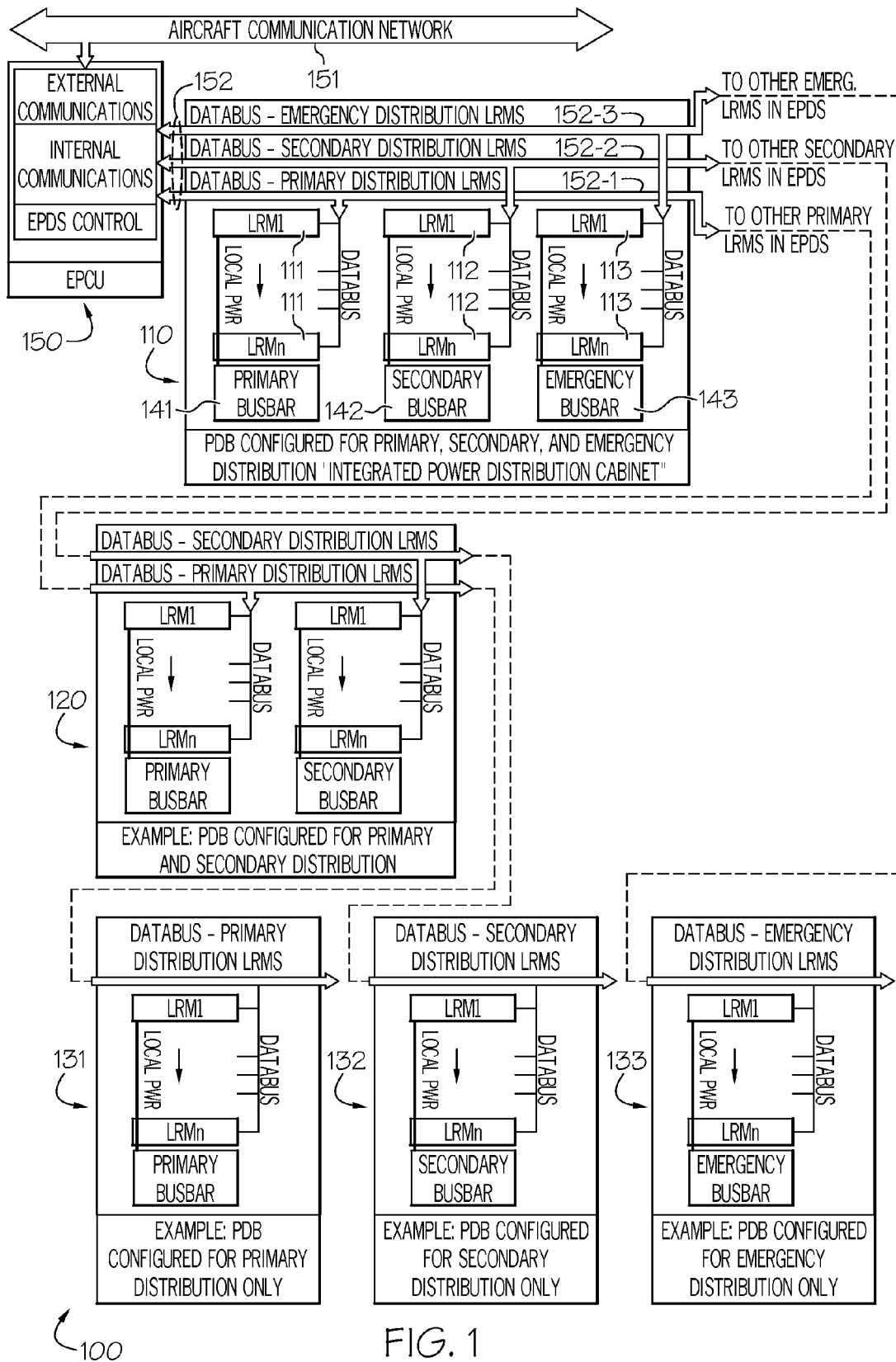
FIG. 1 is a system block diagram showing a few examples of many possible configurations for power distribution boxes (PDB) for an electric power distribution system (EPDS) in accordance with an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a power distribution architecture that employs interchangeable multifunctional line replaceable modules (LRM) and modular power distribution boxes (PDB) as common building blocks for primary, emergency, and secondary electrical power distribution subsystems that are integrated with a single, master electric power control unit (EPCU) into an electric power distribution system for a vehicle. An architecture for an electrical power distribution system (EPDS) in accordance with an embodiment of the invention may require only one common supervisory control interface to the various power distribution functions for the primary, the secondary, and the emergency power distribution subsystems. The entire EPDS can be constructed together by numerous common power distribution boxes (PDB). Each PDB can be built up of numerous next level hardware common building blocks—e.g., the solid state power control line replaceable modules (SSPC-LRM). Embodiments of the present invention may be especially useful for commercial and military aircraft, and may also be applicable to any type of vehicle—such as automobiles, trucks, and ships—where vehicle complexity justifies use of more than just a primary electrical power distribution system.

Embodiments of the present invention differ from the prior art by employing a unique architecture for an EPDS that integrates the primary, emergency, and secondary power distribution functions using a common (e.g., the same LRM could be used in any one of the primary, emergency, and secondary subsystems) multi-functional LRM to provide the switching function for the primary, secondary, and emergency power distribution functions. Each PDB also contains a quantity, which can vary depending on system or aircraft requirements, of LRMs which can be configured to support the required power distribution function (primary, secondary, or emergency). For example, an embodiment of the present invention may implement an EPDS architecture that includes an EPCU and multiple Power Distribution Boxes (PDBs) that contain LRMs only in quantities required to support the aircraft load demands. The commonality (e.g., modularity and interchangeability gained through use of a common type LRM) of the LRMs permits the PDBs to be of various sizes, allowing flexibility to satisfy aircraft installation constraints. The flexibility of the modular PDB/LRM design and the use of common PDBs allow the primary, secondary, and emergency distribution functions to be integrated and physically co-located within the same cabinet—e.g., each PDB cabinet.

Embodiments of the present invention also differ from the prior art in that the EPDS may be controlled by a single electric power control unit, EPCU, that provides external communication from the EPDS to the aircraft, internal EPDS communication to the PDBs, integrated system control and coordination, and an interface to support EPDS maintenance. In an embodiment of the present invention, control and management of the entire EPDS may be provided by the EPCU that is the single gateway between the aircraft network (e.g., by connecting the EPCU to the aircraft main data bus) and an internal data network (e.g., by connecting the EPCU to an EPDS internal data bus) dedicated to the electrical power distribution system data.

In a prior art implementation of a power distribution system, by way of contrast, each primary or secondary subsystem distribution unit is independent and communicates directly to the aircraft, for example, via an aircraft main data bus. Even though both primary and secondary subsystems of the prior art implementation share many common functions, these independent systems typically have different hardware, different software, different physical and electrical interfaces, and different communication interfaces, in contrast to the common hardware, software, physical, and electrical interfaces employed by embodiments of the present invention to achieve an integrated electrical power distribution system.

Embodiments of the present invention may realize comparative weight savings relative to prior art electrical power distribution systems by avoiding the redundancy inherent in the prior art systems. For example, by consolidating all aircraft communication in the EPCU, communication circuitry needed by prior art primary, emergency, and secondary subsystems may be avoided by embodiments of the present invention, thereby saving weight and cost. Also, for example, physical integration of the primary, emergency, and secondary subsystems may realize weight savings through an integrated chassis (e.g., the modular PDB cabinets integrating primary, secondary, and emergency distribution functions) and by avoiding electrical contactors that would, in the prior art system, connect between the subsystems.

Embodiments of the present invention also may realize comparative cost savings relative to prior art electrical power distribution systems by reuse of common components; that is, it may be more cost effective to manufacture a single type, rather than multiple types, of components. For example, both the primary/emergency and secondary distribution subsystems of the present invention can use the same SSPC-based LRM to drive the contactor coils for the primary/emergency subsystems and to drive the loads for the secondary subsystem.

FIG. 1 illustrates an example, in accordance with one embodiment of the present invention, of an electrical power distribution system 100. EPDS 100 employs PDBs 110, 120, 131, 132, and 133. In accordance with the invention, the number of PDBs used by an electric power distribution system—such as EPDS 100—may be variable and may depend on a number of factors, for example, the requirements imposed on the electric power distribution system, the aircraft or vehicle configuration in which the electric power distribution system is installed, and available space and weight constraints. As seen in FIG. 1, each PDB may contain a variable quantity of LRMs (e.g., LRMs 111, LRMs 112, and LRMs 113) which can be configured to support the required power distribution function (primary, secondary, or emergency) so that each PDB may have a configuration that varies from PDB to PDB, depending, for example, on the requirements imposed on EPDS 100 and possibly any of the factors that affect the choice of the number of PDBs. For example, the aircraft electrical load configuration may define how many primary, secondary and emergency loads are required to be supported by the electric power distribution system. The aircraft requirements may also define where in the aircraft the loads are located. The various factors can change from aircraft to aircraft, so that a modular power distribution system architecture as provided by the present invention that allows varying quantities of PDBs of varying sizes and that can support varying quantities of loads provides the ability to readily fit an electric power distribution system to a wide variety of aircraft and other vehicles.

For illustrative purposes, FIG. 1 shows a few examples of many possible configurations for power distribution boxes (PDB) for an electric power distribution system in accordance with embodiments of the present invention, such as EPDS 100. Thus, EPDS 100 may comprise a variable quantity of PDBs which can be configured to distribute primary power (e.g., PDB 131), or secondary power (e.g., PDB 132), or emergency power (e.g., PDB 133), or even any combination of the three (e.g., PDBs 110, 120).

Each power distribution box (e.g., any of PDBs 110, 120, 131, 132, or 133) may be implemented with a cabinet containing the following components: 1) a backplane/motherboard (not shown); 2) power distribution bus bars (e.g., primary subsystem power distribution bus bar 141, secondary subsystem power distribution bus bar 142, and/or emergency subsystem power distribution bus bar 143); and 3) a quantity of LRMs (e.g., LRMs 111, 112, 113) that provide the required number of distribution channels (not shown) for supplying power to the various loads.

The modularity of electric power distribution system architecture, such as that used to implement EPDS 100, may be viewed as an interconnection of PDB building blocks and LRM building blocks. Because of the simplicity of the PDB building blocks, more loads can be supplied, for example, by simply adding additional LRMs to one of the PDBs. Conversely, if there are installation constraints on the aircraft, the PDBs can be made smaller by reducing the number of LRMs, and perhaps increasing the number of PDBs in the aircraft to still satisfy the load distribution demand. With this approach, physical integration of the primary, emergency, and secondary subsystems can be achieved in an integrated PDB cabinet by simply collecting the required number of LRMs for each application (primary, secondary, and emergency), and connecting them to the appropriate bus bar. The simplicity of the PDB/LRM interconnection topology is that the PDB simply becomes a cabinet that houses the required bus bars (primary, secondary and/or emergency) and LRMs to facilitate the desired power distribution.

As shown in FIG. 1, EPDS 100 may include an electric power control unit, EPCU 150 that may provide an interface between the aircraft—via aircraft communication network 151—and the electric power distribution system, EPDS 100—via internal data bus 152. The aircraft communication network 151 may also be referred to as the aircraft or vehicle main data bus 151. The electric power distribution system internal data bus 152 may comprise a primary electric power distribution subsystem data bus 152-1, a secondary electric power distribution subsystem data bus 152-2, and an emergency electric power distribution subsystem data bus 152-3.

Figure 2:
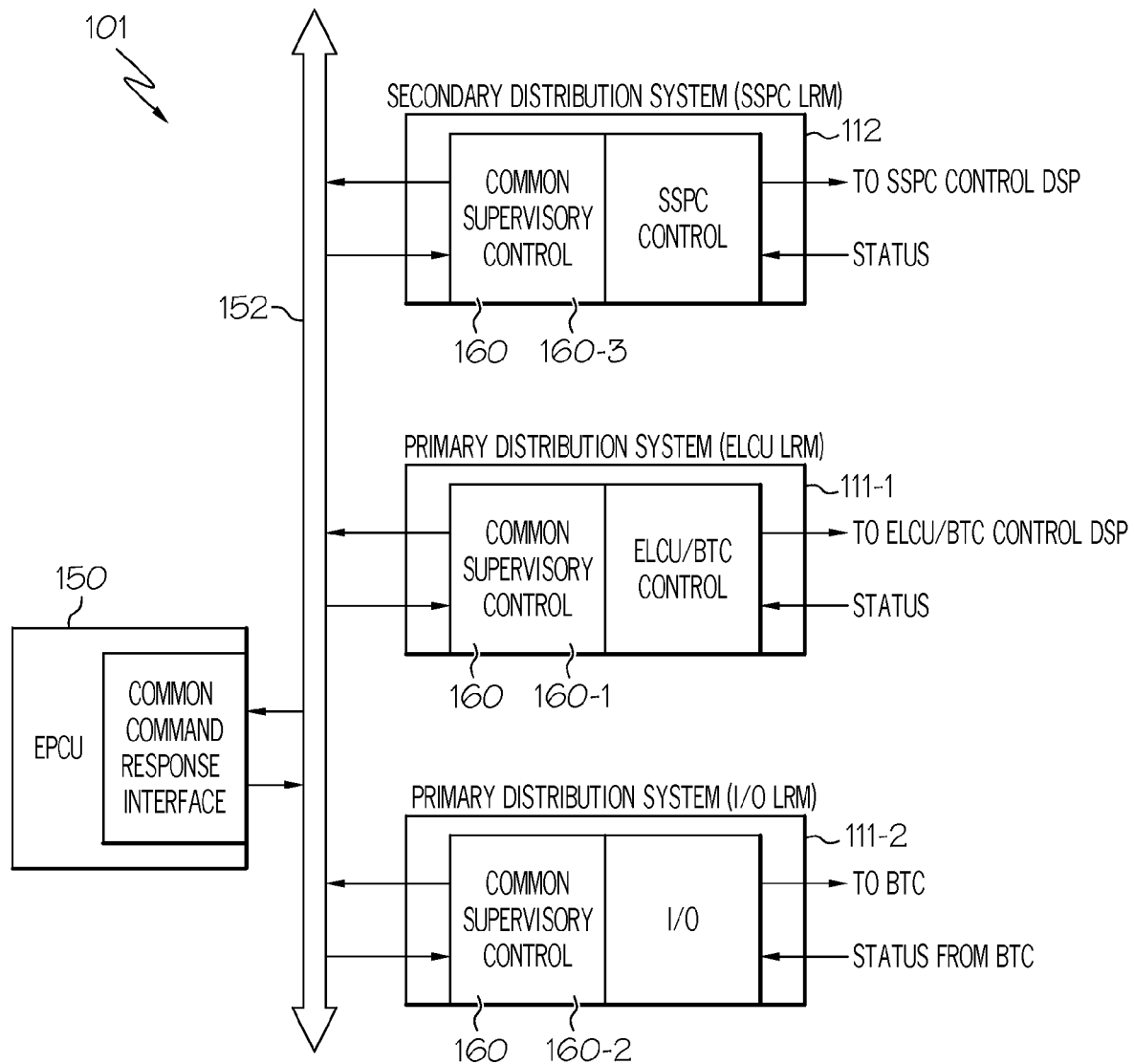
FIG. 2 is a functional block diagram showing an example of common supervisory control interfaces in an electrical power distribution system, such as that shown in FIG. 1.

FIG. 2 illustrates an example of common supervisory control interfaces for LRMs in a portion 101 of an electric power distribution system, such as EPDS 100. LRMs of EPDS 100 may be categorized into types depending on functions performed by the LRM. For example, EPDS 100 may employ an SSPC type LRM, an ELCU type LRM, and an I/O type LRM.

The SSPC LRM 112, ELCU LRM 111-1, and the I/O LRM 111-2 all may employ a common supervisory control interface (CSCI) 160 that provides standard communication functions, commutation functions, reporting functions and local control functions for each LRM—CSCI 160-1 for ELCU LRM 111-1; CSCI 160-2 for I/O LRM 111-2; and CSCI 160-3 for SSPC LRM 112, for example, each of which may be an identical common supervisory control interface 160. The modularity of the integrated EPDS 100 may be facilitated by the use of common supervisory control interface 160 for each LRM of EPDS 100 attached to the internal EPDS network, e.g., internal data bus 152. Each common supervisory control interface 160 may process a common supervisory control logic, which may be implemented, for example, in software, firmware, or hardware. All the LRMs within the EPDS 100 may contain this common supervisory control logic so that all LRMs may be linked together with the EPCU 150 on a common internal data bus 152, the LRMs may all share standard approaches and data for commutation commands and status reporting, and the LRMs also may all share strategies for local control. Such commonalities may further enhance the modularity of the architecture of the present invention for implementing integrated electric power distribution systems such as EPDS 100.

Each type of LRM may also perform electric power distribution functions specific to the type. For example, SSPC LRMs—such as SSPC LRM 112—may be used by the secondary power distribution subsystem of EPDS 100. SSPC LRM 112 may contain a digital signal processor (DSP) used to host a trip engine for each channel, the trip engine providing, for example, various load protection functions such as a circuit breaker function. SSPC LRM 112 may also contain a single DSP, which may contain logic specific to the secondary distribution function, as well as the common supervisory control logic to receive commutation commands from the EPCU and to provide status back to the EPCU, to perform supervisory control of the SSPC LRM 112.

Also, for example, ELCU LRMs—such as ELCU LRM 111-1—may be used by the primary and emergency power distribution subsystems of EPDS 100. ELCU LRM 111-1 may contain a DSP used to control the coils of the primary contactors and bus tie contactors (BTC). ELCU LRM 111-1 may also contain a single DSP, which may contain logic specific to the primary and emergency distribution functions, as well as the common supervisory control logic to receive commutation commands from the EPCU and to provide status back to the EPCU, to perform supervisory control of the ELCU LRM 111-1.

Also, for example, I/O LRMs—such as I/O LRM 111-2—may be used by the primary and emergency power distribution subsystems of EPDS 100. I/O LRM 111-2 may contain a single DSP, which may contain logic specific to the primary and emergency distribution I/O functions, as well as the common supervisory control logic to receive commutation commands from the EPCU and to provide status back to the EPCU, to perform supervisory control of the I/O LRM 111-2.

The integrated electric power distribution system architecture—such as that used to implement EPDS 100—may enable the SSPC and ELCU functions to co-exist on a common LRM—such as any of LRMs 111, 112, 113. When the common LRM is intended to perform the ELCU function, for example, each SSPC channel on the common LRM may be connected to the control coil of an electromagnetic contactor or relay, instead of being connected directly to an aircraft load as may be the case when the common LRM is intended to perform the SSPC function. In addition, the data processing capacity of the DSP on board the common LRM may allow the I/O LRM functions to be distributively allocated to multiple common LRMs, making the common LRM the lowest level hardware common building block in the inventive modular electric power distribution system architecture. Each common LRM may contain several power distribution channels (e.g. 8 to 12 per LRM), based on the required channel density for the application. The common LRMs may be installed in power distribution boxes, which may contain one or more power distribution bus bars, e.g., primary subsystem power distribution bus bar 141, secondary subsystem power distribution bus bar 142, and/or emergency subsystem power distribution bus bar 143. Tapping power from these bus bars may provide the local power supply for each LRM within a PDB.

Figure 3:
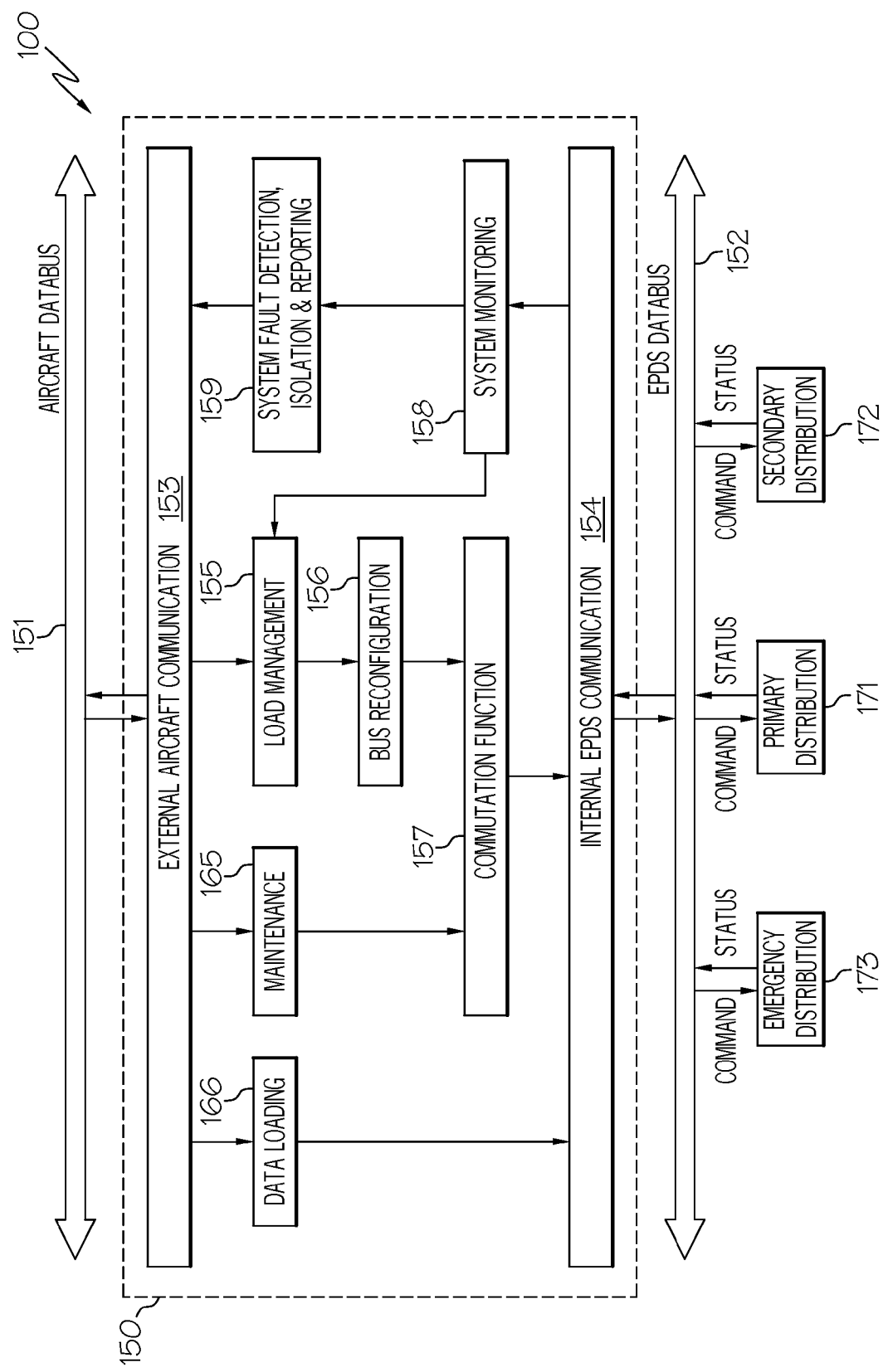
FIG. 3 is a functional block diagram for an electric power control unit (EPCU) in an electrical power distribution system, such as that shown in FIG. 1.

FIG. 3 illustrates an example of an electric power control unit, EPCU 150, in an electrical power distribution system, EPDS 100. The electric power control unit, EPCU 150, may be a standalone control unit containing, for example, circuit card assemblies with microprocessors and software. EPCU 150 may comprise a number of modules, as shown in FIG. 3, for performing the following functions: 1) external communication with aircraft communication network; 2) internal communication using internal EPDS network; 3) control and coordination of primary, secondary, and emergency power distribution subsystems; 4) system monitoring and fault detection, isolation, and reporting; 5) maintenance interface to the electrical power distribution system; 6) data loading of operational software and configuration data files.

EPCU 150 may include an external communication module 153 to perform a function of external communication between the EPDS 100 and the aircraft communication network 151. External communication module 153 may contain hardware and software to communicate with aircraft communication network 151. Thus, EPCU 150 may provide a single gateway between the aircraft communication network (e.g., via an aircraft or vehicle main data bus 151) and an EPDS internal data network (e.g., via an internal data bus 152) dedicated to the electrical power distribution system data.

EPCU 150 may include an internal communication module 154 to perform a function of internal communication with EPDS internal databus 152. Internal communication module 154 may contain hardware and software to communicate with primary power distribution subsystem 171, secondary power distribution subsystem 172, and emergency power distribution subsystem 173 via the internal EPDS databus 152.

EPCU 150 may include modules to perform functions of control and coordination of primary, secondary, and emergency distribution systems 171, 172, and 173, the control and coordination functions including functions of load management; bus reconfiguration; and load commutation.

As shown in FIG. 3, EPCU 150 may include a load management module 155. Based on information from all power distribution system subsystems (e.g., primary 171, secondary 172, and emergency 173), load management module 155 may determine Open/Close commands to groups of contactors. Information may be received, as shown in FIG. 3, by status data coming from the subsystems 171, 172, 173, via internal data bus 152, internal communication module 154, system monitoring module 158; and commands may be transmitted, as shown in FIG. 3, to the subsystems 171, 172, 173, via bus reconfiguration module 156; load commutation module 157, internal communication module 154, and internal data bus 152.

EPCU 150 may include a bus reconfiguration module 156. Bus reconfiguration module 156 may determine Open/Close commands for individual contactors based on, for example, available aircraft power supplies, system fault information, or load management logic commands.

EPCU 150 may include a load commutation module 157. Load commutation module 157 may set the Open/Close commutation command for each contactor in the entire system EPDS 100 (including primary 171, secondary 172, and emergency 173 subsystems).

Continuing with FIG. 3, EPCU 150 may include modules for performing system monitoring functions and fault detection, isolation, and reporting functions. EPCU 150 may include a system monitoring module 158 and a fault detection, isolation, and reporting module 159. System monitoring module 158 may receive status information from the EPDS 100 subsystems 171, 172, and 173 via the internal data bus 152, and perform system level health monitoring. Fault detection, isolation, and reporting module 159 may perform fault detection and isolation based on information received from system monitoring module 158, and reporting to the aircraft systems via external communication module 153 and aircraft communication network 151.

EPCU 150 may include a maintenance interface module 165. Maintenance interface module 165 may provide an interface between EPDS 100 and the aircraft via external communication module 153 and aircraft communication network 151. Maintenance interface module 165 may interface with the aircraft to provide a maintenance interface for any of the EPDS subsystems (e.g., primary power distribution subsystem 171, secondary power distribution subsystem 172, and emergency power distribution subsystem 173). The maintenance actions involve, for example, lock-out/tag-out procedures which directly set commutation commands to the EPDS contactors.

EPCU 150 may include a data-loading module 166 to perform, for example, data loading of operational software and configuration data files. Data-loading module 166 may interface with the aircraft to provide an interface to upload new operational software and configuration data files to the EPDS subsystems (e.g., primary power distribution subsystem 171, secondary power distribution subsystem 172, and emergency power distribution subsystem 173).

Figure 4:
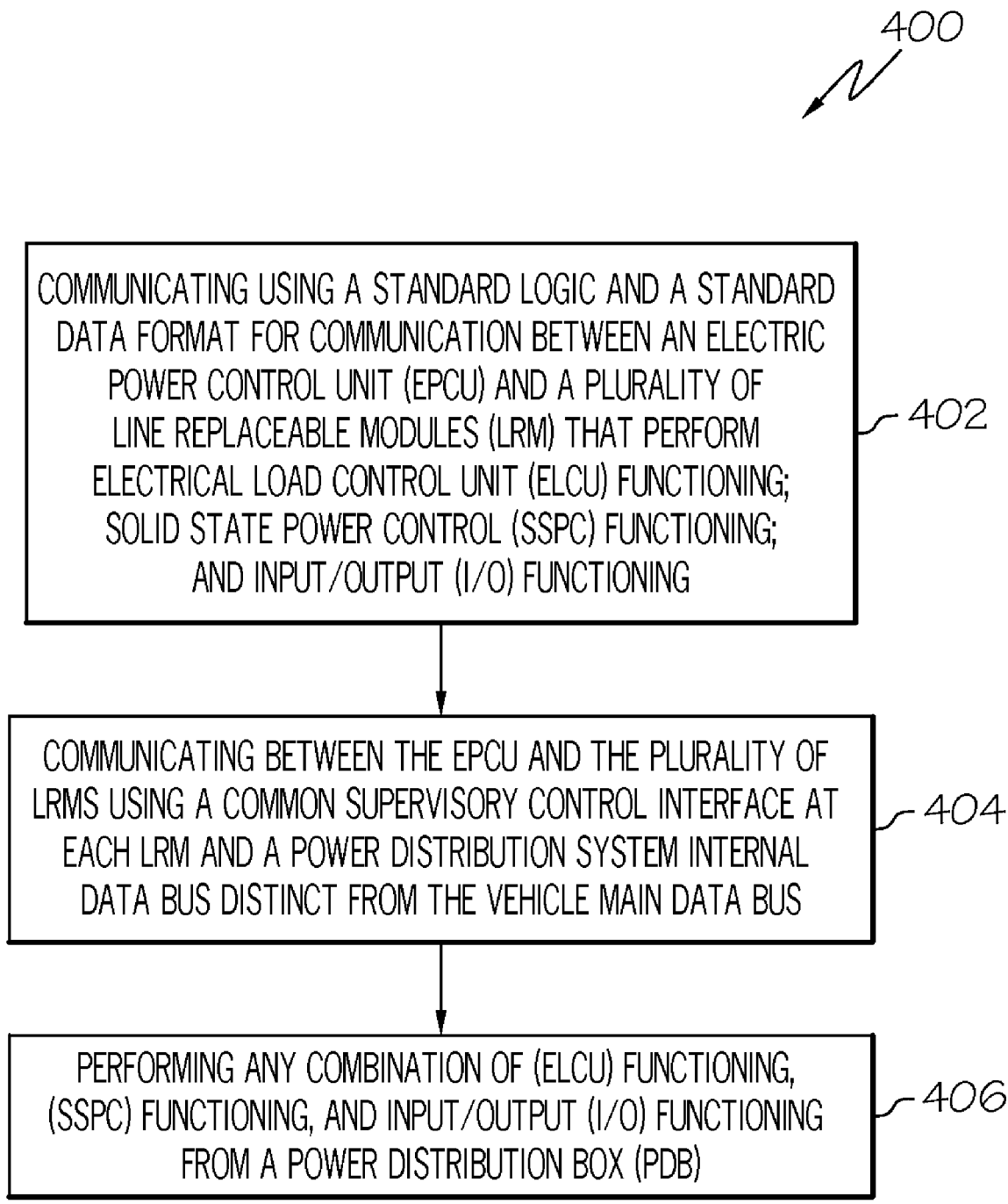
FIG. 4 is a flowchart for a method of distributing electric power in accordance with one embodiment of the present invention.

FIG. 4 illustrates a method 400 for distributing electric power in accordance with one embodiment of the present invention. Method 400 may (e.g., at step 402) communicate using a standard logic and a standard data format (e.g., common supervisory control interface 160) for communication between an electric power control unit (e.g., EPCU 150) and a plurality of replaceable modules (e.g. LRMs 111, 112, 113) that perform electrical load control unit (ELCU) functioning (e.g. LRM 111-1); solid state power control (SSPC) functioning (e.g. LRM 112); and I/O functioning (e.g. LRM 111-2). Method 400 may (e.g., at step 404) communicate between the EPCU 150 and the plurality of LRMs 111, 112, 113 using a common supervisory control interface 160 at each LRM and a power distribution system internal data bus 152 distinct from the vehicle main data bus 151. Method 400 may (e.g., at step 406) perform any combination of ELCU functioning, SSPC functioning, and I/O functioning from any particular power distribution box (e.g., PDB 110 performs all three functions, while PDB 120 performs only two of the three, and PDBs 131, 132, and 133 each perform only one of the three).

It should be understood, of course, that the foregoing relates to exemplary embodiments of the invention and that modifications may be made without departing from the spirit and scope of the invention as set forth in the following claims.

We claim:

1. An electrical power distribution system comprising:
 a plurality of line replaceable modules (LRMs), the LRMs comprising:
  a first LRM connected to a primary power subsystem of the electrical power distribution system and providing electrical load control unit (ELCU) functioning for the first subsystem; and
  a second LRM connected to a secondary power subsystem of the electrical power distribution system and providing solid state power control (SSPC) unit functioning for the second subsystem; and
 one or more power distribution boxes (PDBs), at least one of the one or more PDBs being configured to distribute primary power, secondary power, and emergency power, and at least one of the one or more PDBs containing at least one of the plurality of LRMs;

wherein the first LRM and the second LRM have identical common supervisory control interface units.

2. The system of claim 1, further comprising:

a third LRM connected to the first subsystem of the electrical power distribution system and providing input/output (I/O) functioning for the first subsystem; and wherein the first LRM, the second LRM, and the third LRM each have identical common supervisory control interface units.

3. The system of claim 1, further comprising:

a fourth LRM connected to a third subsystem of the electrical power distribution system and providing ELCU functioning for the third subsystem; and wherein the first LRM, the second LRM, and the fourth LRM each have identical common supervisory control interface units.

4. The system of claim 1, further comprising:

an electric power control unit (EPCU) that provides a master control for the electrical power distribution system and that communicates with the first LRM and the second LRM via each of the identical common supervisory control interface units.

5. The system of claim 1, wherein the first LRM is contained in one of the PDBs and the second LRM is contained in either the same PDB or a second one of the PDBs.

6. The system of claim 1, wherein the power distribution box (PDB) contains at least one power distribution bus bar and a supervisory control interface connection; and wherein:

the PDB is a flexible building block of the electric power distribution system in that the PDB contains at least one LRM, chosen from the group consisting of the first LRM and the second LRM.

7. The system of claim 1, wherein:

the power distribution box (PDB) contains at least one power distribution bus bar and a supervisory control interface connection; and wherein:

the PDB is a flexible building block of the electric power distribution system in that the PDB has accommodation for a variable number of LRMs and the PDB contains a specific number of LRMs required by the electric power distribution system.

8. The system of claim 1, wherein:

the power distribution box (PDB) contains at least one power distribution bus bar and a supervisory control interface connection; and wherein:

the PDB is a flexible building block of the electric power distribution system in that:

the PDB contains at least one LRM, chosen from the group consisting of the first LRM and the second LRM, the common supervisory control interface unit of the at least one LRM connects to the supervisory control interface connection, and the at least one LRM distributes power from the power distribution bus bar.

9. The system of claim 1, wherein:

the power distribution box (PDB) contains at least one power distribution bus bar and a supervisory control interface connection; and wherein:

the PDB is a flexible building block of the electric power distribution system in that:

the PDB has accommodation for a variable number of LRMs and the PDB contains a specific number of LRMs required by the electric power distribution system, wherein:

the common supervisory control interface unit of each LRM of the specific number of LRMs connects to the supervisory control interface connection, and each LRM distributes power from the power distribution bus bar.

10. The system of claim 1, further comprising:

an electric power control unit (EPCU) that provides a master control for the electrical power distribution system and that communicates with the first LRM and the second LRM via each of the identical common supervisory control interface units.

11. An aircraft electrical power distribution system comprising:

a data bus that is internal to the aircraft electrical power distribution system;

an electric power control unit (EPCU) in communication with the internal data bus;

a primary power distribution subsystem comprising a first line replaceable module (LRM) connected in the aircraft electrical power distribution system as an electrical load control unit (ELCU) and having a first common supervisory control interface in communication with the internal data bus;

a secondary power distribution subsystem comprising a second line replaceable module (LRM) connected in the aircraft electrical power distribution system as a solid state power control (SSPC) unit and having a second common supervisory control interface in communication with the internal data bus;

an emergency power distribution subsystem comprising a third LRM connected in the aircraft electrical power distribution system, the third LRM having a third common supervisory control interface in communication with the internal data bus; and at least one power distribution box integrating the primary, emergency and secondary power distribution subsystems, wherein the first common supervisory control interface, the second common supervisory control interface, and the third common supervisory control interface execute a common supervisory control logic to receive commutation commands from the EPCU and to provide status back to the EPCU.

12. The system of claim 11, further comprising:

A fourth LRM connected in the aircraft electrical power distribution system as an input/output (I/O) function LRM and having a fourth common supervisory control interface in communication with the internal data bus; and wherein the fourth common supervisory control interface executes the common supervisory control logic to receive commutation commands from the EPCU and to provide status back to the EPCU.

13. The system of claim 11 wherein:

both the first LRM, the second LRM, and the third LRM each use the same standard of data for commutation commands and status reporting.

14. The system of claim 11 wherein:

the first LRM for ELCU functions contains a digital signal processor (DSP) that executes logic specific to the primary power distribution subsystem and executes the common supervisory control logic.

15. The system of claim 11 wherein:
the second LRM for SSPC functions contains a digital signal processor (DSP) that executes logic specific to the secondary power distribution subsystem and executes the common supervisory control logic.

16. The system of claim 12 wherein:
The fourth LRM contains a digital signal processor (DSP) that executes logic specific to the primary power distribution subsystem I/O functions and executes the common supervisory control logic.

17. The system of claim 11 wherein:
each of the first LRM and the second LRM is of a common type of LRM for which SSPC and ELCU functions co-exist on the common type LRM;
each SSPC channel on the first LRM is connected to a control coil of either an electromagnetic contactor or relay; and
each SSPC channel on the second LRM is connected directly to an aircraft load.

18. The system of claim 11 wherein:
the third line replaceable module (LRM) is connected in the aircraft electrical power distribution system as an electrical load control unit (ELCU), wherein the third LRM for ELCU functions contains a first digital signal processor (DSP) that executes logic specific to the emergency power distribution subsystem and executes the common supervisory control logic; and
a fourth LRM connected in the aircraft electrical power distribution system as an input/output (I/O) function LRM and having a fourth common supervisory control interface in communication with the internal data bus, wherein the fourth LRM contains a second DSP that executes logic specific to the emergency power distribution subsystem I/O functions and executes the common supervisory control logic.

19. A method of distributing electrical power in a vehicle having a main data bus, comprising:
performing electrical load control unit (ELCU) functioning under supervisory control of an electric power control unit (EPCU) using a standard logic and a standard data format for communication between an ELCU-line replaceable module (ELCU-LRM) and the EPCU; and
performing solid state power control (SSPC) functioning under supervisory control of the EPCU using the standard logic and data format for communication between an SSPC-LRM and the EPCU;
performing input/output (I/O) function under supervisory control of the EPCU using the standard logic and data format for communication between an I/O LRM and the EPCU; and
wherein the communication between the EPCU and the ELCU-LRM and the SSPC-LRM and the I/O LRM uses a power distribution system internal data bus distinct from the vehicle main data bus, wherein the internal data bus is common to the ELCU-LRM, the SSPC-LRM and the I/O LRM.

20. The method of claim 19, further comprising:
performing any combination of (ELCU) functioning, (SSPC) functioning, and input/output (I/O) functioning from a power distribution box (PDB).

* * * * *